Aug. 10, 1948.  G. E. DATH  2,446,639
FRICTION SHOCK ABSORBING MECHANISM
FOR RAILWAY DRAFT RIGGINGS
Filed Jan. 18, 1945
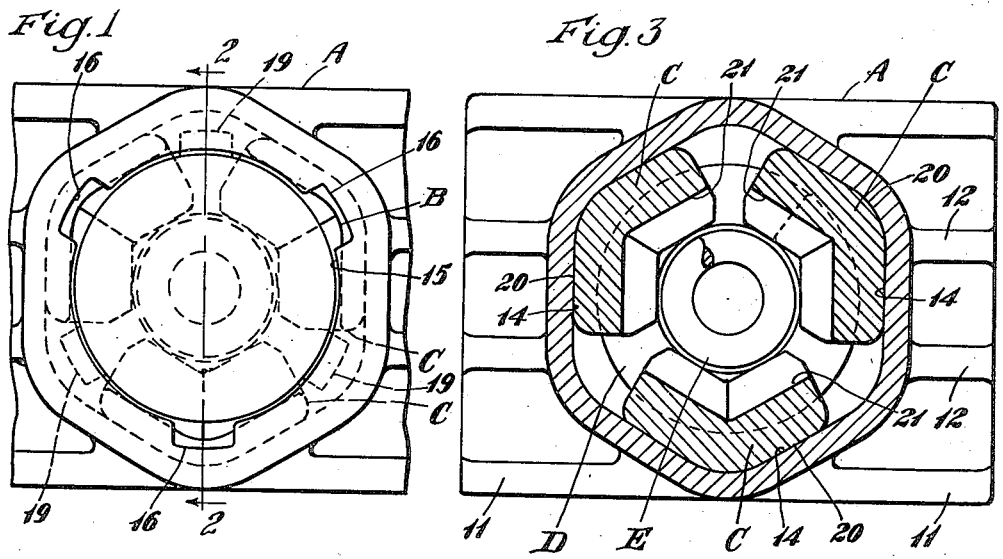
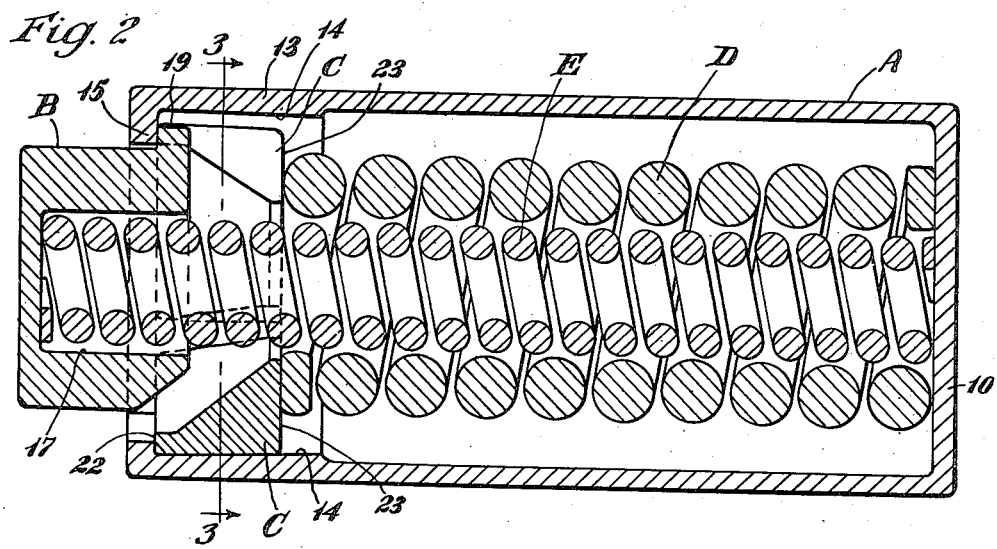
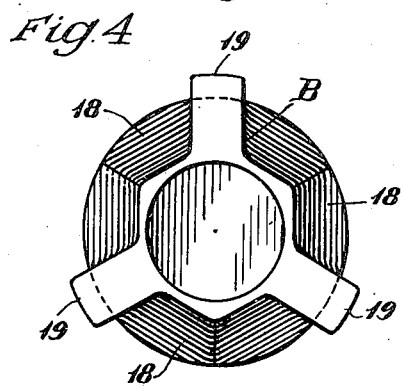
Inventor
George E. Dath
By Henry Fuchs
Atty.

Patented Aug. 10, 1948

2,446,639

UNITED STATES PATENT OFFICE 2,446,639

FRICTION SHOCK ABSORBING MECHANISM FOR RAILWAY DRAFT RIGGINGS

George E. Dath, Mokena, Ill., assignor to W. H. Miner, Inc., Chicago, Ill., a corporation of Delaware Application January 18, 1945, Serial No. 573,357

5 Claims. (Cl. 213—24)

1

This invention relates to improvements in friction shock absorbing mechanisms for railway draft rigging, especially adapted for railway draft riggings.

One object of the invention is to provide a friction shock absorbing mechanism having preliminary spring action to absorb the lighter shocks to which the mechanism is subjected, followed by high frictional resistance to absorb the heavier shocks.

A further object of the invention is to provide a friction shock absorbing mechanism comprising a spring resisted pressure transmitting member adapted to receive the actuating force and provide purely spring resistance during the initial compression of the mechanism to a predetermined extent to absorb the lighter shocks to which the mechanism is subjected, and relatively slidable spring resisted friction elements for producing high frictional resistance to absorb the heavier shocks after the mechanism has been compressed to said predetermined extent, wherein the relatively slidable friction elements include friction shoes and a column element with which the shoes have sliding engagement, and wherein the pressure transmitting member has wedging engagement with the shoes to force the shoes against the column element and slide the same lengthwise thereof to produce high frictional resistance, the wedging engagement of the pressure transmitting element with the shoes being delayed to an extent to provide for said preliminary spring action.

A more specific object of the invention is to provide a friction shock absorbing mechanism comprising a friction casing; friction shoes slidable within the casing; a central wedge block co-operating with the shoes and receiving the actuating force; and spring means yieldingly resisting inward movement of the shoes and wedge block, wherein the spring means includes a preliminary spring opposing inward movement of the wedge and a main spring opposing inward movement of the shoes, the wedge block being held out of operative wedging engagement with the shoes by said preliminary spring until after the mechanism has been compressed to a predetermined extent, whereby compression of said preliminary spring only is effected during said predetermined compression of the mechanism, followed by high frictional resistance after wedging engagement between the wedge and shoes has been effected.

Other objects of the invention will more clearly appear from the description and claims hereinafter following.

In the drawing forming a part of this specification, Figure 1 is a front elevational view of my improved friction shock absorbing mechanism, showing the follower member partly broken away. Figure 2 is a longitudinal, vertical sectional view, corresponding substantially to the line 2—2 of Figure 1. Figure 3 is a transverse, vertical sectional view, corresponding substantially to the line 3—3 of Figure 2. Figure 4 is a rear elevational view of the wedge block of my improved mechanism, looking from right to left in Figure 2.

As shown in the drawing, my improved friction shock absorbing mechanism comprises broadly a friction casing A; a wedge block B; three friction shoes C—C—C; a main spring resistance D; and a preliminary spring resistance E.

The casing A is in the form of a tubular casting of hexagonal, transverse, exterior and interior cross section, open at its front end, and closed at its rear end by a vertical, transverse wall 10. The wall 10 is extended laterally outwardly at opposite sides of the casing, thereby providing flanges 11—11, which form an integral rear follower on the casing, adapted to cooperate with the usual rear stop lugs of the railway draft rigging. The follower flanges 11—11 are reenforced by the usual webs 12—12 which are formed integral with the side walls of the casing at the rear end of the latter. At the forward end thereof, the side walls of the casing are interiorly thickened, as indicated at 13, thereby providing a friction shell section proper of the casing. The friction shell section of the casing A is provided with three longitudinally extending, interior friction surfaces 14—14—14 of V-shaped, transverse cross section. Each friction surface 14 is formed by two adjacent side wall portions of the hexagonal casing. The friction surfaces 14—14—14 converge rearwardly or inwardly of the casing, thereby providing a tapered friction shell section. At the open or forward end thereof, the casing is provided with an inturned retaining flange 15, which is substantially continuous. The flange 15 is notched at intervals, as indicated at 16—16—16, the notches 16 being located at alternate corners of the hexagonal shell in alignment with the longitudinal central portions of the friction surfaces 14 thereof.

The wedge block B is in the form of a cylinder and has a flat front end face adapted to cooperate with the usual front follower of the railway draft rigging. The block B is provided with a rearwardly opening central recess or seat 17, adapted to accommodate the front end portion of the spring E. At the inner end thereof, the wedge block B is provided with three inwardly converging wedge faces 18—18—18 of V-shaped, transverse cross section, the wedge faces 18—18—18 being arranged symmetrically about the central longitudinal axis of the mechanism. At the inner end thereof, the block B is provided with three radially projecting retaining lugs 19—19—19 adapted to engage in back of the flange 15 of the casing A to limit outward movement of the block. In this connection, it is pointed out that the notches 16—16—16 of the flange 15 of the casing A are of such a size that the lugs 19—19—19 of the block B will pass freely therethrough in assembling the wedge with the casing.

The friction shoes C are three in number and cooperate with the friction surfaces 14—14—14 of the casing A. Each shoe has a V-shaped friction surface 20 on the outer side thereof slidingly fitting the corresponding V-shaped friction surface 14 of the casing. On the inner side, each shoe C is provided with a wedge face 21 of V-shaped, transverse cross section, cooperating with and correspondingly inclined to one of the V-shaped wedge faces 18 of the wedge block B. At the forward end, each shoe has a flat abutment face 22 adapted to shoulder against the retaining flange 15 of the casing. As will be clear upon reference to Figures 1 and 2, the shoes C—C—C and the wedge block B are arranged so that the projecting lugs 19—19—19 of the wedge block are engaged between adjacent shoes and thus prevent relative rotation of the wedge block and shoes with respect to each other, the shoes being held against rotation with respect to the casing by virtue of the interengaging V-shaped formation of the friction surfaces thereof. At the rear end, each shoe C presents a transverse, flat face 23, on which the front end of the spring D is adapted to bear.

The spring D is in the form of a heavy helical coil surrounding the spring E and has its front and rear ends bearing respectively on the rear ends of the shoes C—C—C and the end wall 10 of the casing A. The preliminary spring E, which is also in the form of a helical coil extends between the shoes C—C—C and has its front end seated in the recess 17 of the wedge block B. The rear end of the spring E is buttressed against the end wall 10 of the casing A.

In assembling the mechanism, the spring D and the shoes C—C—C are first inserted within the casing A, the shoes being seated on the spring D and spread apart to engage the friction surfaces 14—14—14 of the casing. The spring E is then inserted within the spring D and the shoes forced inwardly of the casing to a predetermined extent, by any suitable tool, such as a three pronged member, having the prongs thereof engaged through the notches 16—16—16 of the flange 15 of the casing and seated against the outer ends of the shoes. The wedge block B is then assembled with the casing A, the mechanism being held compressed to such an extent that the lugs 19—19—19 of the wedge block will pass freely between the flange 15 of the casing A and the front ends of the shoes C—C—C when the wedge block is turned about its axis. In applying the block B to the casing A, the lugs 19—19—19 are entered through the notches 16—16—16 of the flange 15 of the casing and the wedge rotated to the position shown in Figure 1 with the lugs 19—19—19 thereof disposed between the respective friction shoes. The pressure is then removed from the shoes C—C—C, permitting the spring D to project the same forwardly into engagement with the flange 15 of the casing.

In the assembled condition of the mechanism, the inner spring E holds the wedge block B in its outermost position, that is, with the wedge faces thereof in forwardly spaced relation with respect to the wedge faces of the shoes C—C—C. As will be evident, this normal position of the parts provides for preliminary spring action during the time that the wedge B is forced inwardly against the spring resistance E and until the wedge faces of the wedge engage the wedge faces of the shoes, thereby effecting spreading action and inward movement of the shoes with respect to the casing against the resistance of the spring D.

The operation of my improved shock absorbing mechanism is as follows: During compression of the mechanism, the wedge block B is forced inwardly of the casing A, compressing the spring E. This action continues until the wedge faces of the wedge block come into engagement with the wedge faces of the shoes, whereupon the shoes are wedged apart into tight frictional engagement with the friction surfaces of the casing. As inward movement of the wedge continues, the shoes are forced to slide lengthwise of the friction surfaces of the casing against the resistance of the spring D, thereby providing high frictional capacity. As will be evident, the inward movement of the wedge with respect to the shoes during the initial operation of the mechanism provides for preliminary spring action to absorb the lighter shocks, and inward movement of the shoes with the wedge against the resistance of the spring D provides high frictional resistance to absorb the heavier shocks encountered in service. When the actuating force is removed, the expansive action of the springs D and E restores the shoes C and the wedge block B to the normal full release position shown in Figure 2, with the lugs of the wedge block shouldered against the flange of the casing A and the shoes also abutting said flange.

I claim:

1. In a friction shock absorbing mechanism, the combination with a column member having friction surfaces extending lengthwise thereof; of friction shoes having lengthwise sliding engagement with said friction surfaces; a wedge movable lengthwise of said column member, said wedge and shoes having cooperating wedge faces; a preliminary spring reacting between said wedge and column member to yieldingly oppose relative movement of the wedge and column member toward each other lengthwise of the mechanism; a main spring reacting between said column member and shoes to yieldingly oppose relative movement of the shoes and column member toward each other lengthwise of the mechanism; and stop means on said column member engaged by stop shoulders on said wedge to limit outward movement of the wedge with respect to said column member, said shoes shouldering at their outer ends against said stop means to limit outward movement of the shoes with respect to said column member and normally hold said shoes in position with the wedge faces thereof spaced inwardly from the wedge faces of the wedge.

2. In a friction shock absorbing mechanism, the combination with a friction casing having interior friction surfaces; of a plurality of friction shoes in sliding frictional engagement with said friction surfaces; a central pressure transmitting member movable inwardly and outwardly of the casing, said member and shoes having cooperating wedge faces; a spring within the casing yieldingly resisting inward movement of the shoes; a second spring within the casing yieldingly opposing inward movement of said member independently of said shoes; and stop means on the casing with which said member and shoes are engageable for positively limiting outward movement of said member and each of said shoes and normally holding all of said shoes in position with the wedge faces thereof spaced inwardly from the wedge faces of the pressure transmitting member.

3. In a friction shock absorbing mechanism, the combination with a friction casing open at one end and having interior friction surfaces at said open end; of an inturned stop flange at said open end; a plurality of friction shoes in sliding engagement with said friction surfaces, said friction shoes having wedge faces on their inner sides rearwardly of the front ends of the same, said front ends being engageable with the stop flange of the casing to positively limit outward movement of the shoes; a main spring resistance within the casing yieldingly resisting inward movement of the shoes; a pressure transmitting block having wedge faces forwardly of the inner end thereof engageable with the wedge faces of the shoes; stop lugs at the inner end of said block adapted to shoulder against said stop flange to limit outward movement of the block with all of the wedge faces thereof spaced forwardly of the wedge faces of all of said shoes; and a preliminary spring within said casing yieldingly opposing inward movement of the block independently of said main spring resistance.

4. In a friction shock absorbing mechanism, the combination with a friction casing having interior friction surfaces; of friction shoes slidable inwardly of the casing on said friction surfaces; spring means yieldingly opposing inward movement of the shoes; a wedge member adapted to receive the actuating force, said wedge member and shoes having cooperating wedge faces, said member being movable inwardly of the casing; a second spring means yieldingly opposing movement inwardly of the casing of the wedge member only; stop means on said casing with which all of said shoes are engageable to positively limit outward movement thereof; and means on said wedge member engageable with said stop means for limiting outward movement of the wedge member with the wedge faces thereof spaced an appreciable distance from the wedge faces of all of said shoes to provide for movement of said wedge member with respect to the shoes during partial compression of the mechanism, said wedge member being movable independently of said shoes inwardly toward the same during said partial compression of the mechanism and having wedging engagement with the shoes after said partial compression of the mechanism to wedge the shoes against the friction surfaces and force the same inwardly of the casing.

5. In a friction shock absorbing mechanism, the combination with a friction casing having lengthwise extending, interior friction surfaces; of a pressure transmitting wedge block movable lengthwise of the casing; a spring within said casing yieldingly opposing inward movement of said wedge block only; friction shoes within the casing in lengthwise sliding engagement with said friction surfaces; a second spring within the casing yieldingly opposing inward movement of the shoes; stop means on the casing positively arresting outward movement of the wedge block and all of said shoes and holding the wedge block spaced outwardly away from all of said shoes to provide lost motion between the shoes and said wedge block during a predetermined portion of the compression stroke of the mechanism and effect compression of said first named spring only, and said wedge block and shoes having wedging engagement with each other upon further compression of the mechanism after said predetermined compression has been taken up to spread the shoes apart and force the same inwardly of the casing against the resistance of said second named spring.

GEORGE E. DATH.

REFERENCES CITED

The following references are of record in the file of this patent:

UNITED STATES PATENTS

| Number | Name | Date |
|---|---|---|
| 1,136,073 | Westinghouse | Apr. 20, 1915 |
| 1,175,580 | Anderson | Mar. 14, 1916 |
| 2,329,338 | Dath | Sept. 14, 1943 |
| 2,411,630 | Lehman et al. | Nov. 26, 1946 |